Jan. 30, 1962 H. B. NEELEY 3,019,065
GREASE CONTAINER
Filed Nov. 9, 1959 4 Sheets-Sheet 1

H.B. NEELEY
*INVENTOR.*

BY *Ely Silverman*
ATTORNEY

Jan. 30, 1962　　　H. B. NEELEY　　　3,019,065
GREASE CONTAINER

Filed Nov. 9, 1959　　　　　　　　　4 Sheets-Sheet 2

H.B. NEELEY
*INVENTOR.*

BY Ely Silverman
ATTORNEY

Jan. 30, 1962 H. B. NEELEY 3,019,065
GREASE CONTAINER
Filed Nov. 9, 1959 4 Sheets-Sheet 3

H.B. NEELEY
INVENTOR.

BY *Ely Silverman*

ATTORNEY

Jan. 30, 1962 H. B. NEELEY 3,019,065
GREASE CONTAINER

Filed Nov. 9, 1959 4 Sheets-Sheet 4

H.B. NEELEY
*INVENTOR.*

BY Ely Silverman
ATTORNEY

United States Patent Office 3,019,065
Patented Jan. 30, 1962

1

3,019,065
GREASE CONTAINER
Howard B. Neeley, 12 Carson St., Rte. 6, Borger, Tex.
Filed Nov. 9, 1959, Ser. No. 851,902
10 Claims. (Cl. 308—187)

This invention relates to an improvement in grease containers for bearings. More particularly my invention relates to improved bearing grease containers which allow of convenient inspection of bearings of a dynamo electric motor as to the availability of lubricant therefor.

Experience has shown that the overwhelming proportion of motor failures are due to the burning of bearings or shorting of armatures and coil wires due, respectively, to an insufficiency or an excess of lubricant supplied to the bearings. Presently available devices do not allow convenient and ready determination of the amount and condition of the lubricant available for each bearing.

Accordingly, one object of my invention is to provide improved grease containers for motor bearings, such as in an electric motor, which conveniently allow determination of the amount of lubricant in the grease container for such bearings and convenient control of the proper amount of grease addition thereto or removal of excess therefrom.

A further object of my invention is to provide grease containers which provide that even if the grease in said containers should become dirty or fouled with dust, determination of the amount of lubricant in the containers and corrective action, if necessary, may be readily made.

In the annexed drawings of a preferred embodiment of my invention which form a part of this specification and in which the same numerals refer to the same part in all figures:

FIGURE 1 is an overall view, partly in longitudinal section, of a motor with grease containers made according to my invention;

FIGURE 2, left half, is a diametral sectional view of the front grease container 14 along the section shown by line II'—II" of FIGURE 3; FIGURE 2, right half, is an end view of the same front container, as seen along the plane shown by line IIA—IIB in FIGURE 1;

Figure 5:
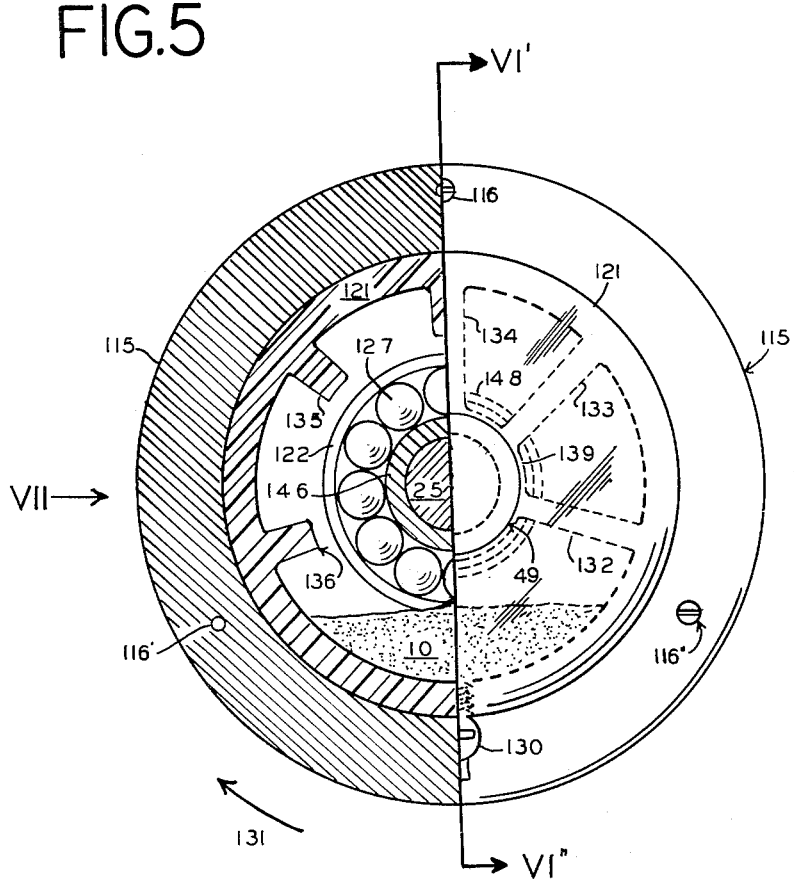
Figure 8:
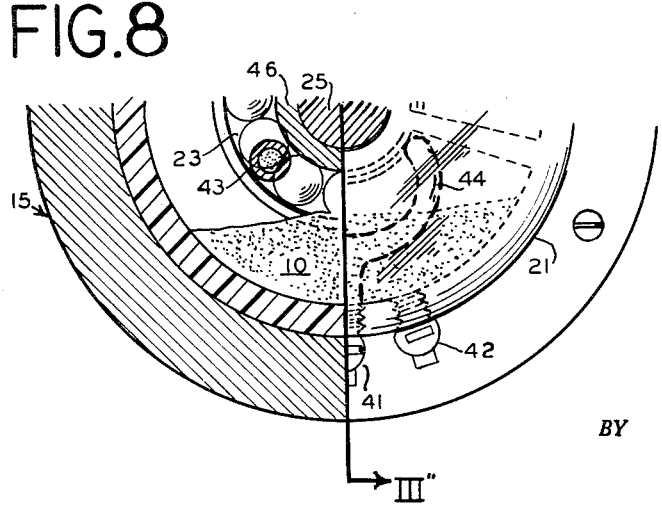
Figure 6:
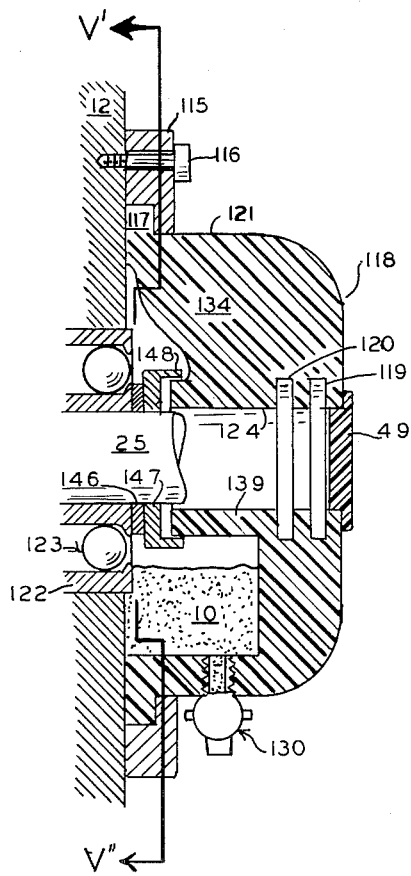
Figure 7:
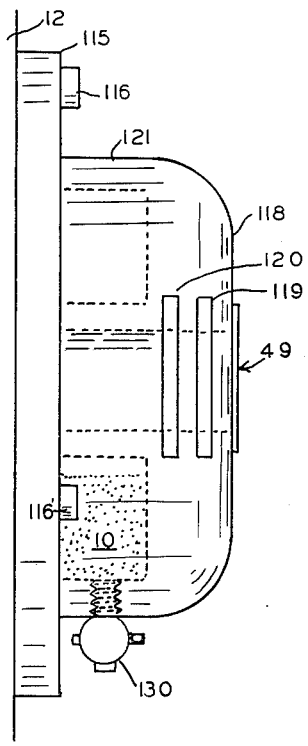

FIGURE 5, left half, is a diametral sectional view of the rear container, 13, along the section indicated by line V'—V" in FIGURE 6; FIGURE 5, right half, is an end view of the rear container as seen along the direction indicated by arrow V in FIGURE 1;

FIGURE 6 is an axial sectional view of the rear container, taken along the plane indicated by line VI'—VI" in FIGURE 5;

FIGURE 7 is a side view of the rear container as seen along the direction indicated by arrow VII in FIGURE 5;

FIGURE 8 shows a variation of the lower portion of the embodiment shown in FIGURE 2; the left and right halves of FIGURE 8 are views, respectively, taken as described above for FIGURE 2.

Figure 1:
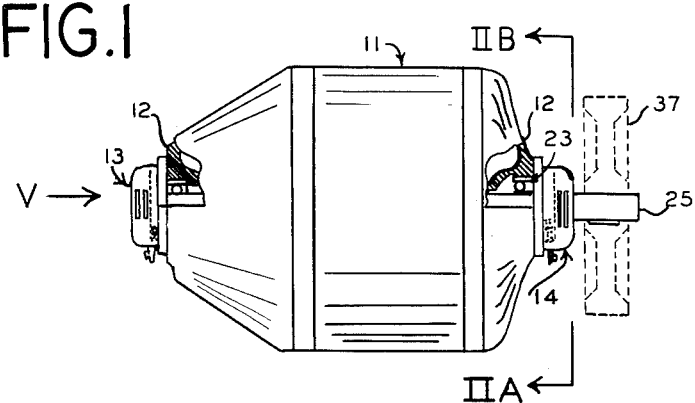

In FIGURE 1, a conventional dynamo-electric motor 11 is schematically shown with a motor frame 12 to which are attached grease containers 13 and 14. As shown in more detail in diagrammatic FIGURES 2, 3, and 4, the

2 grease container 14 is provided with a steel annular lug 15, removably attached to the frame 12, as by screws 16, 16′ and 16″. The lug 15 holds the annular shoulder 17 (provided on the grease container 14) to the motor frame 12. The grease container comprises a transparent end wall portion 18, having a circular outline and a circular hole 24 in the center thereof. This hole 24 fits loosely over the shaft 25 of motor 11 (e.g., .002–.005″ radial spacing between 24 and 25 on a ⅜ inch diameter motor shaft). This end wall portion 18 is provided with a plurality of annular grooves, as 19 and 20. Flat portion 18 is joined to transparent cylindrical side walls 21. Those side walls 21, have smooth interior and exterior surfaces and are joined to the shoulder 17.

In the preferred embodiment, these containers 14 and 13 each have both the side walls as 21 and 121 and end walls as 18 and 118 composed of a transparent grease-resistant material such as polymerized polyvinyl chloride, cellulose acetate or methyl methacrylate. The interior surfaces of the grease container are preferably lyophobic or rendered so by a conventional coating agent.

Figure 2:
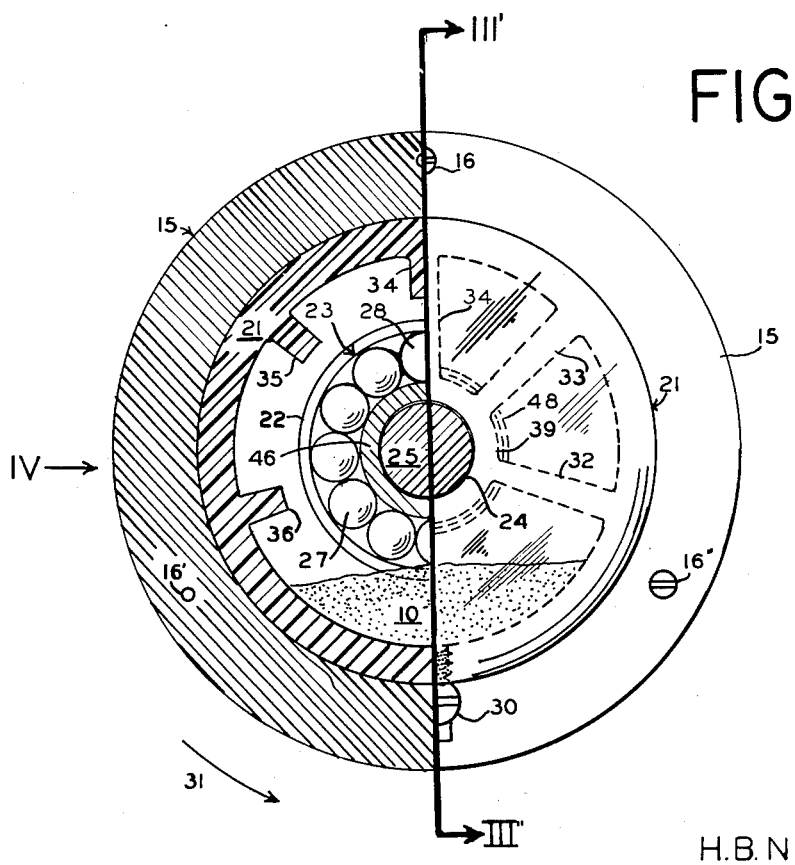

In operation, sufficient grease, as 10, is provided to fill the container as 14 up to a level whereat such grease contacts—as shown in FIGURE 2—the outer bearing race, as 22, of the ball bearing 23 mounted on shaft 25, and provides on the moving members therein, as ball 27, a film of grease on each such member without, however, greasing the shaft 25. Such film will follow said members to the top of the bearing race, as in the position indicated at 28. A dust seal, as 29, may be provided on the exterior face of end wall 18 when necessary. A conventional stopcock valve 30 is provided in the bottom of container 14, i.e. in wall 21, to remove excess grease and also to add grease. The motion of the shaft 25 is counterclockwise as shown by arrow 31 in FIGURE 2.

Figure 3:
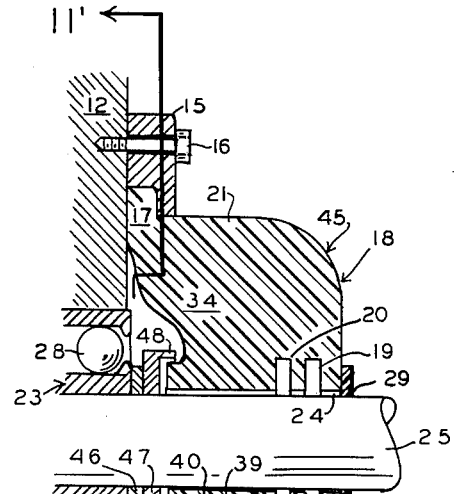
FIGURE 3 is an axial sectional view of the front container, 14, as taken along the plane indicated by line III'—III" in FIGURE 2; this figure additionally shows a feature illustrated in FIGURE 8.

A plurality of ledges, as 32, 33, 34, 35 and 36 extend from the interior of wall 21 toward the shaft 25. These ledges are solid (as shown in FIGURE 3 for ledge 34) and continuous with walls 21 and 18. These ledges do not contact shaft 25 and so do not interfere with the rotation of said shaft 25. However, these ledges do extend close to said shaft 25 and also closely approximate—but do not contact—the outline of the motor frame 12. Thereby the space in the grease container 14 is substantially compartmentalized and air currents through said space in directions parallel to the rotation of shaft 25 are minimized. In the preferred embodiment shown in the figure the ledges 32—36 are firmly connected to sleeve 39, below described. The ledge 32 also prevents any tendency for the grease, 10, to flow upward along the interior of side walls 21 of the container in direction of rotation of shaft 25 shown by arrow 31. Ledge 36 would serve this function when the direction of rotation is reversed.

Figure 4:
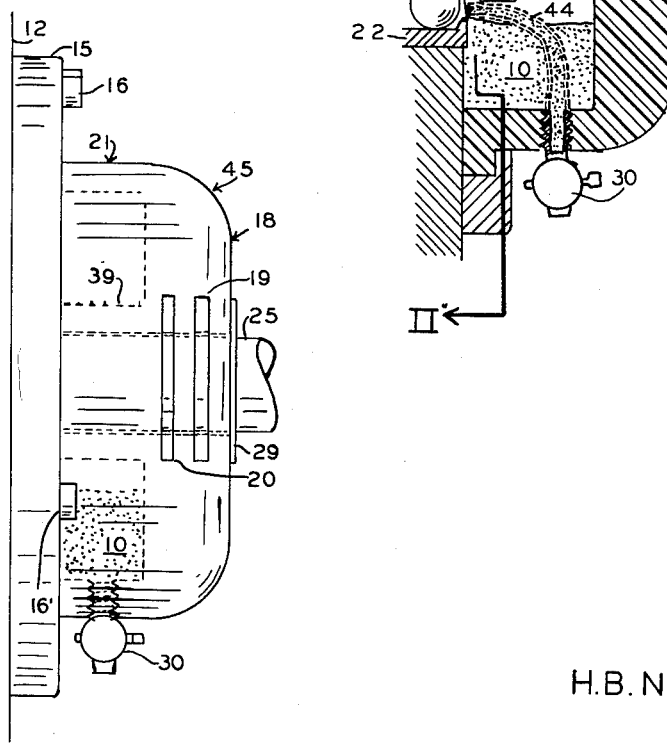
FIGURE 4 is a side view of the front grease container, 14, as seen along direction indicated by arrow IV in FIGURE 2.

Because of the ready visibility of the grease level in the grease containers through the transparent walls 21 and 121 herein provided, as shown in FIGURES 4 and 7, it is easy to add only such amount of grease to provide adequate lubrication to the bearing but not enough to contact the shaft, which latter circumstance would result in throwing of grease onto the armature and coils.

Even when grease becomes dusty, which in the usual circumstances occurs, especially in motors in the field used in conjunction with oil field equipment, this causes no difficulty with observation of the amount of grease in the grease containers of my invention. This is because, inter alia, the lyophobic surface characterizing this inventive device prevents adherence of the dirty oil to such walls, which adherence might otherwise render visual observation therethrough ineffective. Also, ledges 32—36 prevent the establishment in the space within the grease container 14 of strong air currents in the direction of rotation of the shaft 25. Such ledges break up any such air currents and thereby substantially eliminate such oil particles, even mist, from forcefully impinging on wall 21. Accordingly, the ledges in the device of my invention prevent the blocking off of visual observation through wall 21 and provide to the observer a clear view through the transparent wall 21 of the contents of the grease container. This is especially of value for inspection of the front bearings of a motor (the bearing between the motor and the principal source of energy absorption, as pulley wheel 37 diagrammatically shown in dotted lines in FIGURE 1, attached to shaft 25). Such front bearings, because of the close proximity thereto of moving parts, are usually difficult, if not dangerous, to inspect unless all moving parts adjacent to such bearings are brought to a stop. This stoppage and the associated delays in start-up of a motor are time-consuming tasks which result that, frequently, the lubrication of such bearings is not checked and consequently errors therein are not detected or corrected. With my device, however, the grease amount, location, and condition may be made safely, easily, and visually determined during operation of the associated dynamo electric machine.

If the level of grease should become too high or the motor run so hot as to throw grease toward wall 21, and especially when ledges 32—36 and sleeve 39 be omitted, grooves 19 and/or 20 will become filled with a sufficient amount of grease to be readily visually detected because the wall section 18 is transparent and, being curved, as shown, i.e. having a curved outline in a plane parallel to axis of shaft 25 as well as having a curved outline in a plane normal to the axis of shaft 25, acts as a magnifier when grooves as 19 or 20 in the end wall 18 are viewed through wall 18 in a direction perpendicular to shaft 25 as well as when such grooves are viewed generally parallel to shaft 25. It will also be noted that the grease containers of my invention provides for the situation when the machine to which the grease container made according to my invention is attached may have dirty oil or when such machine may suffer such mechanical or electric imbalance as to vibrate so that dirty oil is thrown on the side walls 21 and prevent visual observation therethrough. With use of the device of my invention even if the observation through the side walls of the level of grease is prevented as by coating of the side walls with darkened grease (as when no sleeve 39 or ledges as 32—36 are present) the contents of the grooves 19 and 20 will be clearly visible because the wall section 18 is transparent as above described. Upon detection (in spite of the above-mentioned complications) of grease in grooves 19 and/or 20 corrective action may be taken before the motor is damaged further. Usually grease has a characteristic color—yellow to red—and the grease containers herein provided readily visually show the physical condition of such grease (i.e. if it has broken down or if it has gelled), the presence or absence of dirt and whether or not a proper quantity of grease is present more quickly, more reliably, and more conveniently than dip stick methods.

In the preferred embodiments shown, it will be noted that ledges 32, 33, and 34 in FIGURES 1-4 and 8 (and ledges 132, 133 and 134 in FIGURES 5-7) are attached to a sleeve 39 in FIGURES 1-4 (and in FIGURES 5-7), the interior surface of sleeve 39 (indicated by 40) is close to and peripheral to, yet out of contact with, shaft 25. Accordingly, the sleeve 39 in FIGURES 1-4 and 139 in FIGURES 5-7 serves to minimize the action of air currents (caused by rotation of the shaft 25 in the space enclosed by the container) to carry fine particles of grease onto the side wall, 21 in FIGURES 1-4 and 121 in FIGURES 5-7. The sleeve also serves to minimize the throwing of excess grease from the shaft to the container wall 21 (and 121). This sleeve 39 (and 139) helps insure that the largest possible area of the transparent wall 21 (and 121) is available for observation therethrough of the amount and condition of the grease in the grease container.

In FIGURE 8 is diagrammatically shown a variation of the device shown in FIGURE 2. In FIGURE 8, one fitting, 41, which may be the conventional Zerke fitting, is shown for addition of grease and another fitting, 42, for removal thereof. FIGURE 8 also shows tubes 43 and 44 connected to grease inlet fitting 41. These tubes 43 and 44, as shown in FIGURE 7 in full lines and in FIGURE 3 in dotted lines, directly apply grease to the balls of the ball bearing 23.

In a specific preferred embodiment of my invention hole 24 has a $1\tfrac{11}{16}$ inch diameter, wall 21 has a 3½ inch interior diameter, a 4 inch exterior diameter, and a 1 inch length; the maximum thickness of wall 18 is ⅞ inch and the curvature of the outline of wall 18 measured in a plane parallel to the axis of the shaft 25 at the zone indicated by 45 in the FIGURES 3 and 4 is approximately that of a circle of ⅞ inch radius. Sleeve 39 is adjacent to wall 18 as shown, has an internal diameter the same as hole 24 and a total length of ¾ inch from the inside of wall 18 to the end of sleeve 39; the cylindrical wall of sleeve 39 is $\tfrac{3}{16}$ inch thick; grooves 19 and 20 are each $\tfrac{3}{16}$ inch deep and ⅛ inch wide; groove 19 is centered ⅜ inch from the outside surface of end wall 18 and groove 20 is centered ¼ inch further inward (toward bearing 23) from said center; tubes 43 and 44 are made of ¼ inch outside diameter copper tubing; ledges 32, 33, 34, 35 and 36 are made of ⅛ inch thick sheet stock of the same composition as walls 21 and 18 and glued in place as shown. Ledges 32—36 are cut away to provide space for a nut as 46 and lock nut 47 provided to position shaft 25; the lock nut 47 has a projecting shoulder as 48, which overlaps but does not contact sleeve 39. Sleeve 39 may be tapered at its end distant from the end wall 18 to avoid contact of the sleeve with such nut and shoulder. In the event that no such nut is used and the bearing is press fitted on the shaft, sleeve 39 may be extended so as to closely approximate the bearing 23, while not contacting same. The sleeve 39 will, therefore, as shown in the figures, extend from the end wall, as 18, towards the bearing, as 23, and extend as shown in the drawings for far more than one-half the distance from that grease container and wall to the associated bearing.

The arrangement of the elements 32—36 serves to minimize air currents in the space in the grease container which currents might otherwise be caused by the rotation of the motor shaft, as 25, projecting into or passing through said space. It will be further noted that the above described location and arrangement of the sleeve 39, effect a substantially complete isolation of the surface of the rotating shaft, 25, from the remainder of the space within the grease container 14. The sleeve 39 thus serves to prevent clouding and loss of transparency of the side walls 21 due to oil coating the interior of such walls. While ledges 32—36 may be made of stock sheet of the same material of which walls 21 and 18 are made and glued in place, it is, of course, within the scope of my invention that ledges 32—36 be formed by molding in the same operation and die as is used to form the remainder of the grease container, and so enable the grease containers for the front and rear bearings of a given size machine to be formed in the same die.

Similar parts have similar functions in the rear bearing grease container 13 shown in FIGURES 5, 6, and 7. In FIGURES 5, 6 and 7 all parts of the grease container 13 similar to the parts of container 14 are shown with numbers 100 units higher than the corresponding parts above discussed and shown in FIGURES 2, 3 and 4 for the front bearing 14. Thus, the rear bearing grease container 13 is held in juxtaposition to the motor frame 12 by annular lug 115. This lug is removably held in place by screws 116, 116' and 116". The lug 115 holds annular shoulder 117 which is connected to end wall 118 by cylindrical transparent side wall 121. This side wall has smooth interior and exterior surfaces. End wall 118 has annular grooves 119 and 120 therein. Grease, 110, is controllably added to container 13 up to a level whereat said grease so contacts the outer race 122 of ball bearing 123 as to provide grease to the balls therein, as 127, and to provide a film of grease on each such ball member, which film follows said balls to the top position on said bearing. However, the level of the grease 110 in container 13 is maintained sufficiently low so as to not apply grease to shaft 25. A valve 130 is provided at the bottom of the grease container for such addition and removal of grease. When the direction of rotation of shaft 25 is the same in the absolute sense as shown in FIGURE 2, the rotation of that shaft is shown by the arrow 131 in FIGURE 5. Ledges 132, 133, 134, 135 and 136 extend from the side walls 121 to the sleeve 139 as in container 14 to effect a compartmentalization of the space within the rear bearing grease container and break up air currents parallel to the rotation of shaft 25 as above described for ledges 32—36 in container 14. The sleeve 139 extends to almost contact nut 147; in conjunction with shoulder 148 of nut 147, sleeve 139 serves to substantially completely isolate the surface of the rotating shaft from contact with the remainder of the space in the chamber of container 13. Rear bearing container 13 is provided with a plug 49 which tightly fits into passage 124. Thus, the front and rear bearing grease containers for the same machine may be made with the same molding die.

It is within the scope of my invention, in order to effect isolation of the rotating shaft from the grease container interior space, that the sleeve 139 (and 39) overlap the rotating shaft and its nut as well as that the nut overlap the sleeve, as shown in the figures. The dimensions for the preferred embodiment of rear bearing grease container, 13, are the same as above given for container 14. It will be noted that the ledges 135 and 136 in the rear bearing grease container 13 correspond to ledges 35 and 36 in container 14. Plug 49 is, in the preferred embodiment, made of the same transparent plastic as end wall 121 and end wall 118.

Detection of the level of grease and its condition in the front bearing of such motors has particularly been inconvenient and unreliable heretofore. As shown in FIGURE 1 there are usually machine parts as 37 along the axis of the shaft. These make axial inspection difficult. By use of my invention, hereinabove described, inspection of the condition of the grease for this bearing, which bearing is subjected to radial stresses from the forces developed on the shaft exterior of the motor (e.g. weight of supported part, shock transmitted to and from such part, etc.) is effected and, thus, considerably facilitated, expedited, and simplified, by visual inspection of the contents of that grease container; this visual inspection may be conveniently made along a line of sight perpendicular to the motor shaft. The grease in the container may be observed through the transparent side walls or the presence of grease in the annular grooves in the transparent end wall may be readily visually detected. The similar inspection of the contents of the grease container for the rear bearing is also expedited, facilitated and simplified by use of a rear bearing grease container made according to my invention.

I claim:

1. An externally located grease container in combination with an anti-friction bearing located in a motor casing wall and wherein a rotatable shaft of cylindrical outline passes through and is supported by said anti-friction bearing, said grease container enclosing a space which is juxtaposed peripheral to said bearing and into which space said shaft projects and adjacent to which said bearing lies, said grease container being composed of a side wall extending axially parallel to yet spaced apart from said shaft and an end wall, said end wall being located on a plane substantially normal to the axis of said shaft, and transparent in a direction along a radius of said shaft and containing a circular passage therethrough only slightly larger in cross section area than the cross-sectional area of said shaft and concentric therewith, said side wall and said end wall cooperating to form only one lubricant reservoir in said container, said reservoir being located at the bottom of said container, and a conduit passing through a wall of said container from said reservoir to the outside of said container for filling and emptying said reservoir.

2. A grease container as in claim 1 wherein said circular passage is provided with an annular groove, having an internal diameter the same as that of said circular passage and a larger external diameter, said annular groove being entirely located within the thickness of said end wall, and said end wall has a curved peripheral longitudinal outline so as to present an enlarged view of the annular groove when said groove is viewed through said end wall along a radius of said shaft.

3. An externally located readily removable grease container in combination with an anti-friction bearing located in a motor casing wall and wherein a rotatable shaft of cylindrical outline passes through and is supported by said anti-friction bearing, said grease container enclosing a space which is juxtaposed peripheral to said bearing and into which space said shaft projects and adjacent to which said bearing lies, said grease container being composed of a side wall and an end wall, said end wall being located on a plane substantially normal to the axis of said shaft and transparent in a direction along a radius of said shaft and containing a circular passage therethrough only slightly larger in cross section area than the cross sectional area of said shaft and concentric therewith, said side wall and said end wall cooperating to form only one lubricant reservoir in said container, said reservoir being located at the bottom of said container, and a conduit passing through a wall of said container from said reservoir to the outside of said container for filling and emptying said reservoir and there being a plurality of annular grooves in said passage, each of said grooves having an internal diameter the same as the diameter of the said circular passage, each of said grooves having a larger external diameter than said internal diameter, and a plurality of said grooves being located within the thickness of said end wall.

4. A grease container as in claim 3 wherein said end wall has a curved longitudinal peripheral outline so as to present an enlarged view of the said annular grooves when said grooves are viewed along said end wall along a radius of said shaft.

5. A grease container as in claim 1 wherein said side wall is transparent and a ledge extends radially from said side wall towards said shaft and traverses a substantial portion of the distance therebetween while not contacting said shaft.

6. A grease container as in claim 1 wherein said side wall is transparent and a ledge extends radially from said side wall towards said shaft and traverses a major portion of the distance therebetween while not contacting said shaft.

7. A grease container as in claim 1 and containing a circular sleeve having an internal diameter only slightly larger than the external diameter of said shaft and being concentric therewith, said sleeve extending from said end wall towards said bearing and extending a major portion of the distance from said end wall towards said bearing and substantially isolating said shaft from the remainder of the space enclosed by said grease container.

8. A grease container as in claim 5 wherein said side wall is transparent and a plurality of ledges each extend radially from said side wall towards said shaft and traverse a major portion of the distance therebetween while not contacting said shaft.

9. A grease container as in claim 8, comprising also a circular sleeve having an internal diameter only slightly larger than the external diameter of said shaft and being concentric therewith, said sleeve extending from said end wall towards said bearing and extending a major portion of the distance from said end wall towards said bearing.

10. A grease container as in claim 9 wherein said ledges extend from said end wall of said sleeve.

References Cited in the file of this patent
UNITED STATES PATENTS

| | | |
|---|---|---|
| 2,266,107 | Waterfill | Dec. 16, 1941 |
| 2,348,843 | Pearce | May 16, 1944 |
| 2,919,962 | Hencken et al. | Jan. 5, 1960 |
| 2,959,457 | Szymalak | Nov. 8, 1960 |

OTHER REFERENCES

Modern plastics, October 1937, pages 28, 29 and 60 relied upon.